United States Patent [19]

Tickner et al.

[11] Patent Number: 5,313,584
[45] Date of Patent: May 17, 1994

[54] MULTIPLE I/O PROCESSOR SYSTEM

[75] Inventors: Robert H. Tickner, Jeffersonville; Philip A. Murphy, Jr., King of Prussia; Wayne A. Genetti, Phoenixville, all of Pa.

[73] Assignee: Unisys Corporation, Blue Bell, Pa.

[21] Appl. No.: 796,747

[22] Filed: Nov. 25, 1991

[51] Int. Cl.⁵ .............................................. G06F 15/02
[52] U.S. Cl. ................................................ 395/275
[58] Field of Search ............ 395/275, 325; 364/200, 364/900, 228.5, 230.3, 230.4, 282.2, 281.6, 285.1; 371/9, 16

[56] References Cited

U.S. PATENT DOCUMENTS

| | | | |
|---|---|---|---|
| 4,443,849 | 4/1984 | Ohwada | 364/200 |
| 4,495,562 | 1/1985 | Yamaji et al. | 364/200 |
| 4,705,171 | 2/1990 | Kiel et al. | 364/200 |
| 4,750,113 | 6/1988 | Buggert | 364/200 |
| 4,802,164 | 1/1989 | Fukuoka et al. | 371/16 |
| 4,888,727 | 12/1989 | Getson et al. | 364/900 |
| 4,910,704 | 3/1990 | Gemma | 364/900 |
| 4,931,922 | 6/1990 | Baty et al. | 364/200 |
| 4,937,783 | 6/1990 | Lee | 364/900 |
| 4,939,644 | 7/1990 | Harrington et al. | 364/200 |
| 5,038,275 | 8/1991 | Dujari | 364/200 |

Primary Examiner—Dale M. Shaw
Assistant Examiner—Moustafa M. Meky
Attorney, Agent, or Firm—Ratner & Prestia

[57] ABSTRACT

The present invention involves the use of multiple I/O processors (204) and (206), configured in parallel in an I/O system (104), to increase system performance as well as enhance system resiliency. Performance is increased by programming one of the multiple I/O processors with the added ability to allocate received I/O job requests among the active I/O processors including itself, thus allowing for parallel processing. The I/O system resiliency is enhanced by ensuring that any one of the I/O processors can assume the tasks of any other I/O processor which may fail. The I/O system described above employs a load balancing algorithm to evenly distribute the I/O job functions among the active I/O processors.

18 Claims, 7 Drawing Sheets

MULTIPLE I/O PROCESSOR SYSTEM

BACKGROUND OF THE INVENTION

2. Field of the Invention

This invention is in the field of multi-processor computer systems. In particular, an I/O system is disclosed in which multiple I/O processors, configured in parallel, perform I/O system functions.

2. Description of Prior Art

A very large multi-processing system or a very large single processing system adapted for multi-programming requires large amounts of data for its various computations and thus is provided with a hierarchy of storage units ranging from main memory to bulk storage devices such as disk drives to peripheral devices such as tape drives, and the like. The system is provided with I/O controllers which control the data transfer from the peripheral devices to the disk storages or from the peripheral devices and the disk storages to main memory. However, in such prior art systems the central processors decode the I/O instructions and send the respective control signals to the I/O controllers. These operations can take up an unduly large amount of the execution time of the processor. Examples of such prior art controllers are disclosed in the Annunziata et al. U.S. Pat. No. 3,432,813 and the Calta et al. U.S. Pat. No. 3,447,138.

Attempts have been made to free the central processor from this I/O execution so that the central processor can spend more time on user jobs by supplying a separate general purpose processor to operate independently in the control of input/output data transfers. However, there must be some communication between the two processors in order to assure that the data required by the main central processor is received in its main memory before the central processor uses that data.

Input/output operations include more than just data transfers between the peripheral devices and main memory. For example, the I/O system must control such non-data transfer operations as rewinding tape reels and the like. Furthermore, in very large data processing systems, there are a number of different buses and peripheral controllers that may be chosen to optimize through-put from the peripheral devices to main memory and vice versa. In addition, particularly in regard to disk drives, a cache memory may be provided to store the most recently accessed data segments in the cache, which data segments are more likely to be accessed again shortly. However, these disk functions are handled by an operating system running on a central processor, requiring the processor to spend additional time that could be employed in running user jobs or tasks.

Statistical studies indicate that a major portion of each processor's time is employed in executing operating system functions. From these studies, it is estimated that the overhead of such management functions has been anywhere between 10 percent and 50 percent, and occasionally even higher. Furthermore, a goodly portion of the time that the corresponding central processor is executing operating system functions is employed in establishing process priority, performing functions on events (to be defined below) and initiating input/output operations. If these functions could be removed from the operating systems, then the through-put of the data processing system should be substantially enhanced.

SUMMARY OF THE INVENTION

The present invention is in the context of an I/O system which includes at least two I/O processors, an I/O controller, and a data structure which divides and assigns peripheral I/O devices between the master and slave I/O processors. Both I/O processors perform high level I/O job functions including job scheduling, path selection, statistics gathering, and device managing. The I/O controller, using the data structure, allocates received I/O job function requests among active I/O processors in the system.

According to another aspect of the invention, the functions performed by the I/O controller and a selected one of the I/O processors may be combined. In this configuration, the selected I/O processor is referred to as a master I/O processor. The other I/O processor is referred to as a slave I/O processor.

According to another aspect of the invention, the I/O system described above performs a load balancing algorithm to evenly distribute the I/O job functions among the I/O processors. Generally, the algorithm monitors the number of I/O jobs each I/O device performs in a predetermined time interval. At the end of the interval, the I/O jobs relating to the individual I/O processors are totalled. If the difference between the highest and lowest totals is greater than a predetermined maximum allowable difference, at least one of the I/O devices assigned to the highest total processor is reassigned to the lowest total processor.

According to another aspect of the invention, the master and slave I/O processors described above can replace one another in the case that one may fail. Generally, if a slave fails, the master has direct access to the slave's important operating data and so, can take over the slave's incomplete or pending I/O jobs. On the other hand, the slave can replace a failed master with the aid of a maintenance console and a serial scan path which are used to access the master's important operating data and transfer it to the slave before restarting the system.

BRIEF DESCRIPTION OF THE FIGURES

FIG. 4b is a combined block diagram and data structure diagram of the system components involved in the process of FIG. 4a;

FIG. 5b is a flow chart representing the unit switch portion of the algorithm shown in FIG. 5a;

DETAILED DESCRIPTION OF THE INVENTION

I. Introduction

The present invention is embodied in an I/O system which includes multiple I/O processors, configured in parallel, to increase system performance as well as to enhance system resiliency. Performance is increased by programming one of the multiple I/O processors with the added ability to allocate received I/O job requests among the active I/O processors including itself, thus allowing for parallel processing. The I/O system resiliency is enhanced by ensuring that any one of the I/O processors can assume the tasks of any other I/O processor which may fail.

II. Processing System

Figure 1:
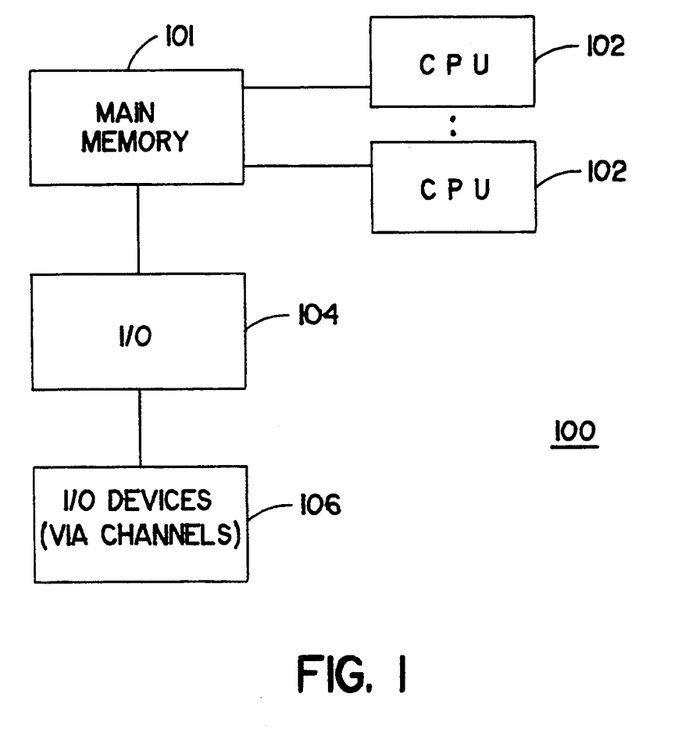
FIG. 1 is a block diagram of a processing system which may include an embodiment of the present invention.

FIG. 1 shows a processing system 100 in which the present invention operates. The components of processing system 100 include a main memory 101 coupled to at least one CPU 102. As indicated in the figure, the exemplary embodiment employs a plurality of CPU's 102. Main memory 101 is also coupled to I/O module 104 which indicates the functional location within processing system 100 of the exemplary embodiment of the invention. The I/O module 104 is coupled to a plurality of peripheral I/O devices represented by block 106.

As CPU's 102 run their respective application programs, requests to transfer information between main memory 101 and I/O devices 106 frequently arise. These requests are followed by I/O job requests generated by CPU's 102. The I/O job requests are then coordinated and carried out by the processors which make up I/O module 104.

III. I/O Module

Figure 2:
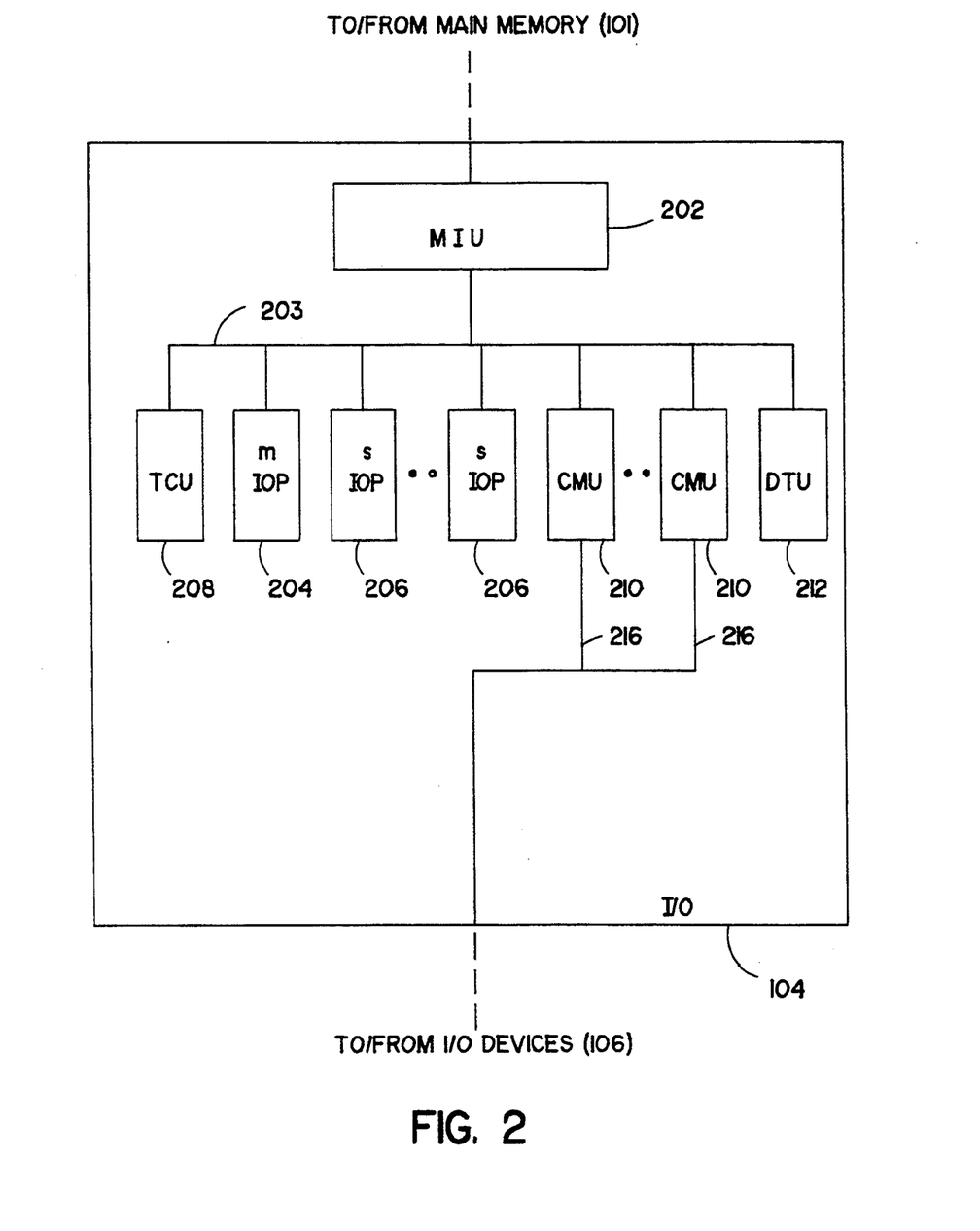
FIG. 2 is a block diagram of the I/O module shown in FIG. 1.

A more detailed view of the exemplary embodiment of the processors in I/O module 104 is shown in FIG. 2. Directly coupled to main memory 101 is memory interface unit (MIU) 202. MIU 202 is also connected via a control/data bus 203 to a plurality of processors: a master I/O processor (mIOP) 204, a slave I/O processor (sIOP) 206, a task control unit (TCU) 208, a channel management unit (CMU) 210, and a data transfer unit (DTU) 212.. As indicated in FIG. 2, there may be multiple sIOP's 206 and multiple CMU's 210. The exemplary embodiment described herein, however, employs a plurality of CMU's 210 but only one sIOP 206. Finally, CMU 210 is coupled to the I/O devices 106 via the Channel Service Bus (CSBus) 216. As seen in FIG. 2, for each CMU 210 in I/O module 104 there is a corresponding CSBus 216.

In the exemplary embodiment of the invention, each processor, except MIU 202, is a substantially similar computer circuit which is physically realized with a hardware device known as an I/O controller (IOCT) and peripheral hardware (i.e. drivers, receivers, memory, etc.).

An IOCT is a small programmable processor. Each IOCT contains an ALU, several registers, a barrel shifter, a local memory, as well as a microcode sequencer, a bus interface and an interrupt controller.

The different IOCT's are initialized with different firmware. This firmware configures each IOCT into one of the five different types of I/O system processors: a task control unit (TCU) 208, a master I/O processor (mIOP) 204, a slave I/O processor (sIOP) 206, a data transfer unit (DTU) 212 or a channel management unit (CMU) 210.

Both mIOP 204 and sIOP 206 perform high level I/O functions such as the scheduling of I/O jobs, the selection of data paths over which I/O jobs are performed, the gathering of job statistics and the management of I/O devices and of a disk cache.

However, mIOP 204 is distinguished from the sIOP 206 by the additional ability of mIOP 204 to enter an interrupt state for the purpose of allocating received I/O job requests among the active I/O processors (IOP's) in the I/O module 104, including itself. (Note: When the specification is referring to the common functions of an I/O processor the abbreviation 'IOP' is used; however, when a distinction needs to be made the prefix "m" indicating master or "s" indicating slave is used.)

It is contemplated that the job allocation functions performed by the master IOP may, instead, be performed by one of the other processors, for example, by the task control unit (TCU) 208.

The data transfer unit (DTU) 212 performs block data transfers from one location in main memory 101 to another upon the request of an IOP 204 or 206. DTU 212 is also used for disk caching. A more detailed description of DTU 212 is provided below.

The channel management unit (CMU) 210 manages data movement between the main memory 101 and any peripheral I/O devices 106 (e.g. disks and tape drives) which may be coupled to processing system 100. CMU 210 communicates with external channels through the Channel Service Bus (CSBus) 216. Each CSBus 216 can be coupled to a plurality of external channel adaptors (not shown), each of which is capable of controlling one or more peripheral I/O devices. A more detailed description of CMU 210 is provided below.

The task control unit (TCU) 208 provides overall system control by allocating and deallocating events, maintaining the status of tasks running on the system, performing task priority computations and scheduling the execution of tasks. A more detailed description of TCU 208 is provided below.

The remaining processor in I/O module 104 is the memory interface unit (MIU) 202. The MIU 202 handles the buffering and issuing of addresses in main memory 101 for store and fetch operations. The MIU 202 also handles translation between logical and physical addresses, and arbitration of a plurality of requests from the memory 101.

MIU 202 provides a memory interface between the above-mentioned processors/units and main memory 101. For instance, if a processor/unit needs to store data in memory, first, MIU 202 requests the data in the intended destination addresses; next, MIU 202 receives the data needing to be stored by the processor/unit which, in turn, will modify or replace the data retrieved from main memory 101; finally, MIU 202 writes the set of modified or replaced data back to the intended destination addresses in main memory 101.

Task Control Unit

The TCU 208 monitors the status of all processes within the system. This includes overseeing all tasks and events that are active within the system. Thus, the TCU 208 supports task control functions, such as maintaining the status of as many as one-half million events; and implementing a set of functions to be performed on events, including waiting on events, causing events, and resetting events.

In performing these functions, the objective of the TCU 208 is to keep each CPU 102 within processing system 100 as busy as possible. Thus, while a CPU 102 is performing a task, it may require additional data, and may issue an I/O job request to the I/O module 104, primarily to TCU 208, to obtain this data. The task then waits for this I/O job to complete before continuing execution.

A task which exists on the system is said to be in one of three states:

WAIT state—Processing of the task is suspended while the task is waiting for an event to occur (e.g. an I/O job to be completed).

READY state—The task has been placed in the ready queue and is waiting for a CPU 102 to become available. A task may undergo a transition to the READY state as a result of a completed I/O job causing the TCU to set an event.

ALIVE state—The task is currently running on a CPU.

The TCU 208 maintains the state of each task, so that it can instruct a CPU 102 which has become available to begin executing the next task which is in the READY state.

In addition, the TCU 208 implements a function which enables a task to change from a WAIT state to a READY state. When an IOP 204 or 206 completes an I/O job for a particular task, the IOP notifies the TCU 208 that the requested data is now available in main memory 101. The TCU 208 associates the completion of the request with the requesting task and then changes the state of the task from WAIT to READY. When a CPU 102 becomes available, the task having the highest priority of all currently READY tasks is assigned to the CPU 102.

Channel Manager Unit (CMU)

The CMU 210 is, in the exemplary embodiment, the only processor in I/O module 104 that has direct communication paths with both the MIU 202 and the channels leading to the I/O devices.

In operation, the CMU 210 receives and temporarily stores an I/O request generated by an IOP 204 or 206. The CMU 210 acknowledges the I/O request and notifies the channel that the it has a task for the channel to perform. This is called a host service request (HSR).

Some time later, the channel issues an adapter service request (ASR) indicating that it is ready to perform the task. Once notified of a request, the channel drives an I/O through three phases (command, data, and result) by utilizing a sequence of the following operations:

Control Out—used by the channel to request command or control information from the manager;

Status In—used to send status information to the CMU; and

Data In—used to send data from the channel to the CMU; and

Data Out—used to send data to the channel from the CMU.

Some time later, the channel that sent the ASR requests service from the CMU 210 at which time the CMU 210 sends a formatted command packet for the I/O job to the channel. The command packet includes information on which I/O device this I/O job may need to use, the address on the device where this data may be found, and the amount of data to be provided. The channel then performs similar operations for the controllers that it services, passing information down the chain until it reaches the device which contains the requested data. Data is then moved from the channel to the main memory 101 via the CMU 210.

Data-in requests are performed for as many packets as are required for the total I/O operation. Data is not sent in one long stream, but rather is divided into packets for error checking and to improve performance. Likewise, if the I/O request requires that data be written from memory to a device (tape, disk, printer), the channel issues a data-out request indicating that the device is ready to receive data.

Data Transfer Unit

When an IOP 204 or 206 receives a disk I/O job request by a standard IOCB and message interface, before the IOP 204 or 206 passes the request on to a CMU 210 to get the data from the specified disk, it first checks a table (not shown) supporting and controlling a disk cache memory area. This is done to determine if any or all of the information requested for this I/O job is already present in memory. If the disk cache portion of memory does not contain any of the data which the CPU 102 is requesting, the I/O job is passed to the CMU 210 which gets the data and places it in main memory as described above. If, however, some or all of the information is present in the disk cache portion of memory, then the DTU 212, instead of the CMU 210, moves the data to the user buffer portion of main memory 101.

The DTU 212 appears to the IOP 204 or 206 as a bus or channel. It communicates with an IOP the same way a channel (or bus) does and it is issued I/O jobs through a queue structure as a channel (or bus).

The IOP 204 or 206 can identify the portions of an I/O job having data which is in the disk cache. A user typically requests a sequential block of information from a disk. Depending on the amount of data that is requested (from word 0 to word n), the data actually contained on the disk will fall within one or more tracks on the disk. A caching algorithm implemented in the I/O system caches the complete track which was last accessed by the user in anticipation of future use. But if a user I/O job is the first I/O request issued when the system comes up then the cache is empty.

IV. Load Table

Figure 3:
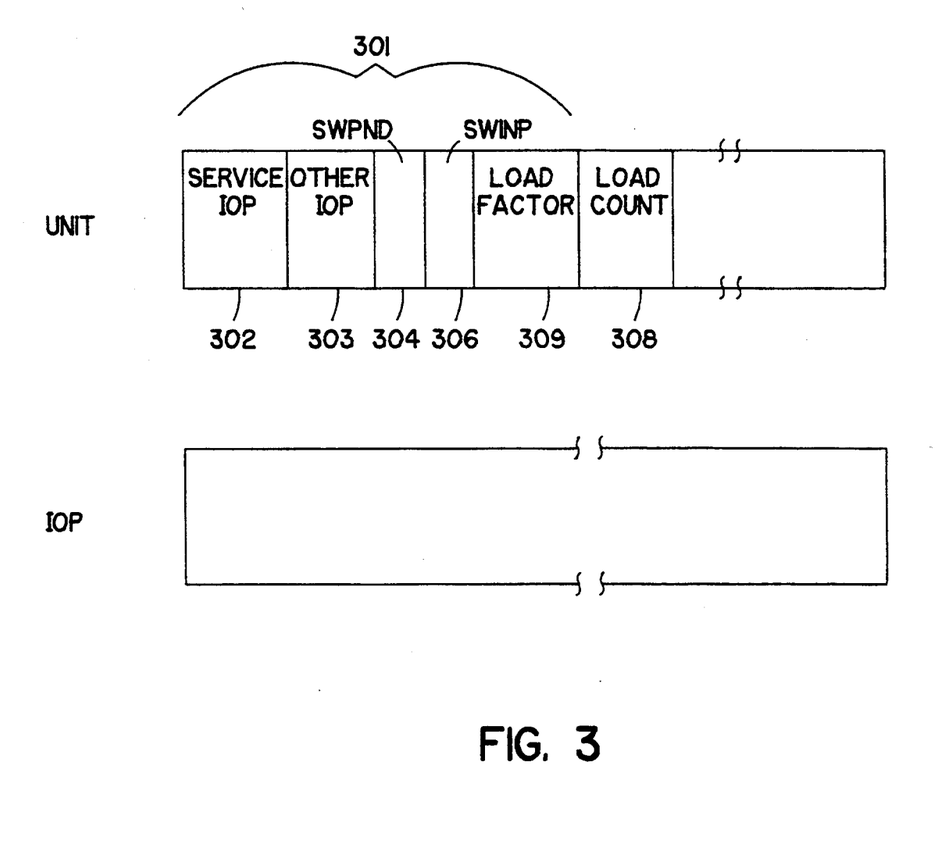
FIG. 3 is a data structure diagram of the field partitioning for a data structure used by the IOP's of FIG. 2.

FIG. 3 shows the field partitioning of a data structure which is used for static and dynamic control of the IOP 206 and I/O device(s) 106. This control information is updated and maintained in the local memory of the IOP's 204 or 206, which ever one is designated as the master. Alternatively, this data structure may exist in the memory of another processor (e.g. TCU 208) which is being used as the I/O distributor. Note also that while in the present embodiment the load balancing is executed in the IOP, this method of monitoring the load balance for the I/O system could be executed elsewhere in the processing system.

The dynamic control information comprising the SERVICE IOP field 302 up to and including the LOAD COUNT field 308 is referred to as the load table 301. The SERVICE IOP field 302 indicates which IOP, 204 or 206, is assigned to service a particular device.

The OTHER IOP field 303 is used during a unit switch, in which the SERVICE IOP field 302 is replaced with the OTHER IO field 303.

The SWPND and SWINP fields 304 and 306 indicate whether a unit switch is pending or a unit switch is in progress, respectively. A unit switch, which is discussed in detail below, refers to the switching of an I/O device from the current IOP 204 or 206 servicing this particular device to some other active IOP 204 or 206 in I/O function block 104.

Figure 5A:
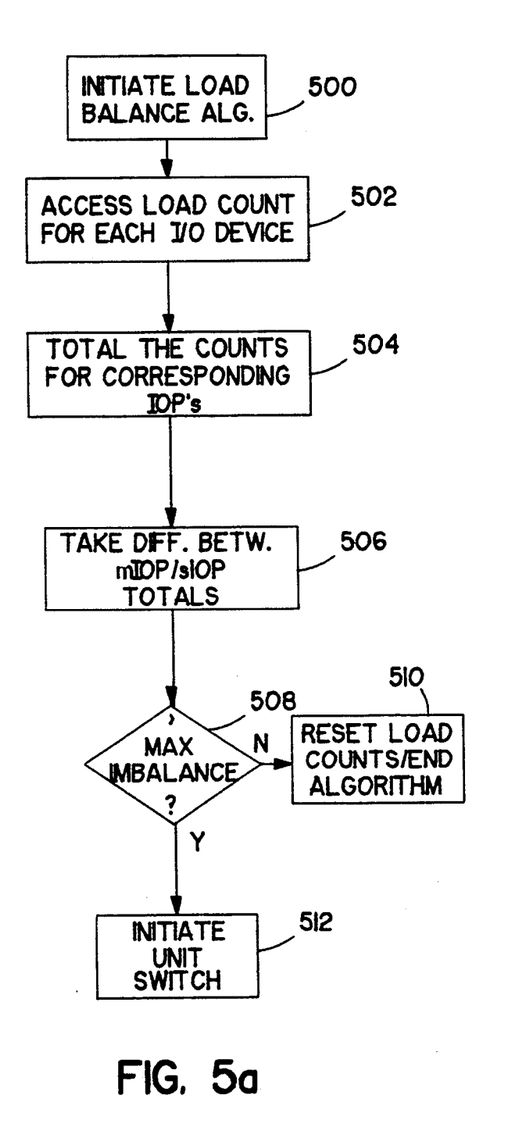
FIG. 5a is a flow chart representing the load balancing algorithm implemented by the IOP's of FIG. 2.
Figure 5B:
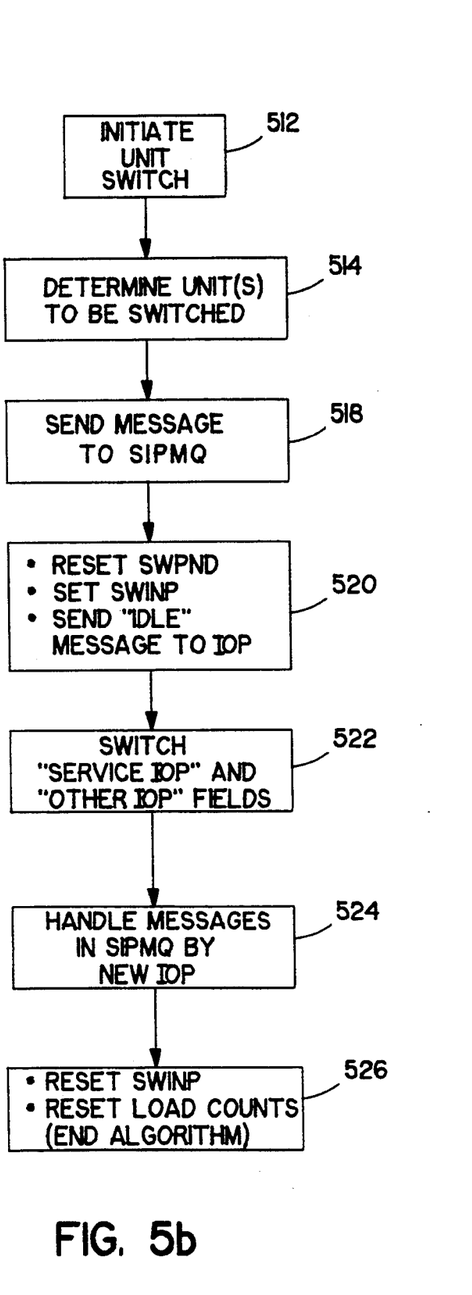

The LOAD COUNT field 308 keeps track of how many I/O jobs this particular I/O device has participated in within a previous predetermined time interval. In the exemplary embodiment of the invention, this predetermined time interval is one second. The count that is maintained in this field does not have to be a true count of actual I/O's but may contain a scaled count (related to time consumed) based on a load factor contained in the LOAD FACTOR field 309. The LOAD COUNT field 308 is used during a load balancing algorithm performed by mIOP 204. The load balancing algorithm, which is discussed below with reference to FIGS. 5a and 5b, is designed to maintain an evenly distribution of I/O activity among the active IOP's 204 and 206. The above-mentioned unit switch is one phase of the load balancing algorithm.

V. Functionality of the IOP's

With reference to FIG. 2, the parallel configuration of the mIOP 204 with sIOP 206 is well-suited for serving and enhancing many aspects of processing system 100. One such enhancement is increased I/O processing performance which is achieved by providing for the parallel processing of I/O job requests.

Figure 4A:
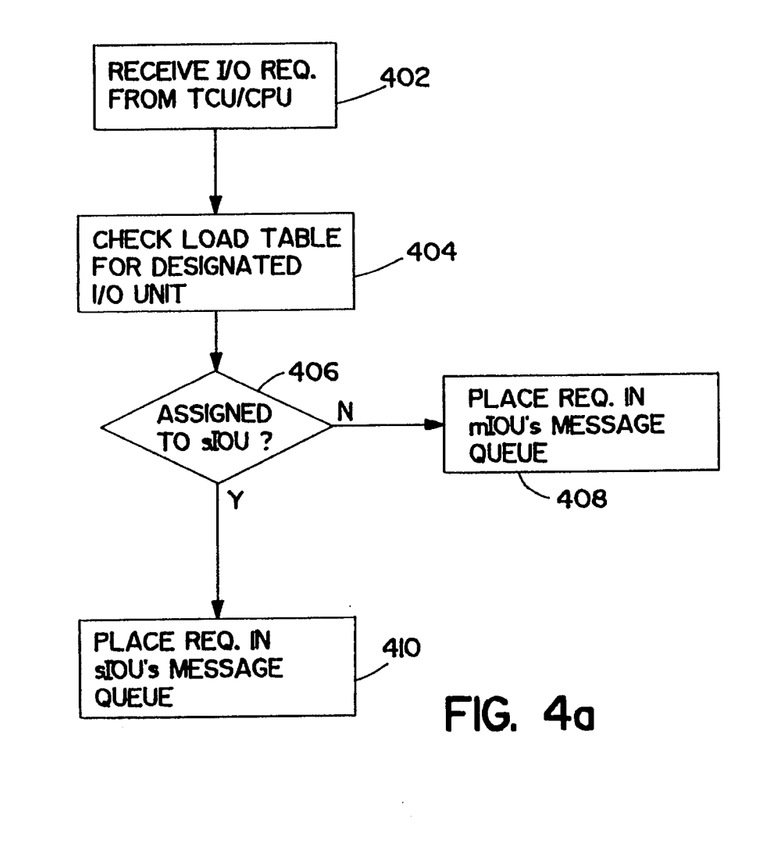
FIG. 4a is a flow chart representing the I/O job request allocation process implemented by the IOP's shown in FIG. 2.

FIG. 4a is a flow-chart representing the control flow of the mIOP 204 in allocating a received I/O job request between itself and any sIOP's 206 in processing system 100. To supplement FIG. 4a, FIG. 4b is provided to illustrate the steps of FIG. 4a by depicting the interaction between relevant concerned system components and data structures.

Figure 4B:
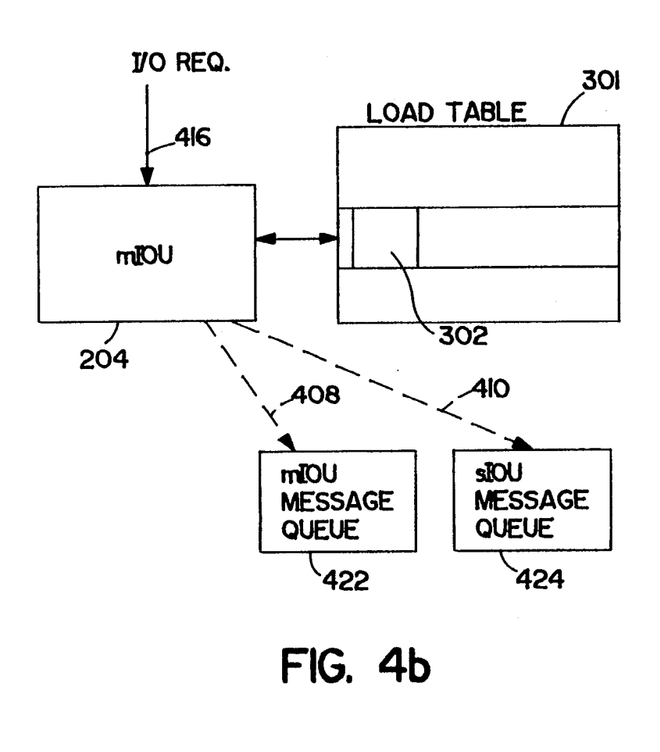

Starting with FIG. 4a, the process for allocating an I/O job request by mIOP 204 begins with the receipt of an I/O job request from either CPU 102 or TCU 208 as indicated by step 402 (and the corresponding arrow 416 of FIG. 4b). Upon receiving the I/O job request which may designate a particular I/O device, mIOP 204 temporarily stops performing its I/O job functions and enters an interrupt state.

Once in the interrupt state, mIOP 204 checks load table 301, in particular, the SERVICE IOP field 302 which indicates which IOP has been designated to service the requested I/O device as indicated in step 404. The information in SERVICE IOP field 302 is processed, step 406, to determine whether mIOP 204 or sIOP 206 will carry out the I/O job request. If the I/O device has been assigned to sIOP 206, as represented by step 410, mIOP 204 forwards the I/O request to the message queue 424 of sIOP 206. If, however, the I/O device has been assigned to mIOP 204, then mIOP 204, still operating in the interrupt state, takes on the I/O job request by placing the request in its own message queue 422, as indicated by step 408.

Each IOP 204 and 206 contains a message queue, which is a data structure within its local memory, for storing the pending I/O job requests for which the IOP is responsible.

Once the I/O job request is placed in the proper message queue, mIOP 204 exits the interrupt state and resumes functioning like the other IOP's in the system. The appropriate IOP 204 or 206 can now act upon its queued I/O job request. Each of these requests includes a reference to an I/O Control Block (IOCB). An IOCB is a small block of information in main memory 101 that contains all of the pertinent information needed to complete an I/O job. This information includes the status of the I/O job, the type of I/O job, time-out criteria, error reporting information, buffer addresses, and event reference.

The designated IOP 204 or 206 retrieves the IOCB from main memory 101 and checks to ensure certain criteria are satisfied. In the exemplary embodiment of the invention, these checks include: that the format and contents indicate a valid I/O job is requested; that the device is present in the system; and that the device referenced by this IOCB is in the proper state (i.e. a state in which it can receive an I/O request).

If these criteria are met and the device is idle, then the IOCB is linked into the active queue for the IOP 204 or 206. This queue includes all active I/O jobs for which the IOP is responsible. However, if the device is not idle then the request is placed in the unit queue to wait until the unit becomes idle. The IOP also writes the IOCB back to main memory 101 with its unique identification code, thus providing a record indicating which IOP is responsible for the I/O job. The I/O job starts with IOP 204 or 206 executing a variety of algorithms to select a path for performing the I/O job.

In the path selection process, the designated IOP 204 or 206 determines which device is being requested (i.e. disk drive, tape unit, printer, etc.). For resiliency purposes, such as hardware malfunctions, several paths are generally available for communicating with any specific device, and the above-mentioned algorithms using this information make the proper selection.

Once a path is selected, the IOCB is linked into a queue which corresponds to the controller for the selected path; however, if the device associated with the chosen path does not have a controller, the IOCB is linked into an alternate queue designed to complete the I/O job request. For example, if the particular device is a DTU, since the DTU does not have a controller, the IOCB is linked into a corresponding bus queue. Depending on the attributes of the I/O job, that queue may be accessed by a CMU 210 or DTU 212. If accessed by a CMU 210 (e.g. for a disk read), the IOP 204 or 206 receives a message requesting the I/O job. Such an I/O job request may be, for example, a request that a block of information from a specific device be written into main memory 101. The IOP 204 or 206 selects a path consisting of a channel (not shown), also referred to as a bus or port, and a controller (not shown). The IOP can then communicate with the specific device via the channel and controller and link the device into the corresponding queue. An interrupt message is then sent to the chosen CMU 210 signalling that there is a queue containing an I/O job for that CMU 210 to perform.

After managing the I/O job which used its channel, the CMU 210 notifies the responsible IOP 204 or 206 that the job is complete. If the I/O job completes without error, the IOP then sends a corresponding message to the TCU 208. The TCU 208, in turn, causes an event associated with the operation to occur, thus changing the state of the waiting task allowing it to continue and/or complete.

VI. Load Balancing

Another feature of the parallel configuration designed to enhance performance is the load balancing feature. Note that the discussion of this feature relates to the material disclosed in Appendix A. The load balancing feature attempts to distribute I/O activity evenly among the active IOP's 204 and 206 using a load balancing algorithm. In the exemplary embodiment, the load balancing algorithm is performed once per second.

FIG. 5a shows a flow-chart representing the procedure that the mIOP 204 follows to determine whether the assignments of certain IOP's 204 and/or 206 to certain peripheral I/O devices 106 need to be rearranged. As indicated by step 502, mIOP 204 first accesses the load table 301 and, in particular, LOAD COUNT field 308 for the load count—the scaled number of I/O jobs the device has participated in during the previous second—for each I/O device in processing system 100. The load counts are then individually totalled for each of the corresponding IOP's 204 and 206, step 504.

As indicated by step 506, the difference of the individual totals for mIOP 204 and sIOP 206 is then compared to a predetermined maximum allowable difference or maximum imbalance number, step 508. If the difference calculated in step 506 is less than the maximum allowable imbalance, then this branch of the load balancing algorithm has reached an end and mIOP 204 resets the LOAD COUNT fields 308 for each I/O device 106 in processing system 100, step 510. If, however, the difference at step 516 is greater than the maximum allowable imbalance, then mIOP 204 continues with the load balancing algorithm and initiates the unit switch portion of the load balancing algorithm, step 512.

FIG. 5b shows a flow-chart representing the unit switch portion of the load balancing algorithm. Appendix B is a source code listing of a program which implements this algorithm. First, the I/O device(s) to be switched are determined, step 514. For reasons set forth below, in the exemplary embodiment of the invention, only one device is switched at a time.

To determine the device(s) to be switched, mIOP 204 analyzes the I/O count breakdown for each device serviced by the IOP's 204 and 206. For the purpose of illustration, and not limitation, an example of an I/O count breakdown is shown in Table I with the remainder of the explanation referring thereto:

TABLE I

| DEVICE | IOP | # of I/O's |
|--------|-----|------------|
| A | 204 | 5 |
| B | 204 | 10 |
| total for IOP 204 is | | 15 |
| C | 206 | 10 |
| D | 206 | 20 |
| total for IOP 206 is | | 30 |

Because the total number of I/O jobs for sIOP 206 (i.e. 30) is greater than that for mIOP 204 (i.e. 15) and the difference between them is greater than the maximum imbalance (i.e. 10), then one or more devices assigned to sIOP 206 may be switched to mIOP 204. The exemplary embodiment of this invention includes an mIOP 204 and only one sIOP 206, thus, these IOP's will be the subjects of the load balancing algorithm; however, if more than one sIOP 206 were in the system, the algorithm would target the IOP with the highest total and the IOP with the lowest total, regardless of the master and slave configuration.

Next the algorithm searches for the device assigned to sIOP 206 having a load count closest to the imbalance divided by 2 which, in this case, is device C. At this point, the SWPND field 304 in the load table 301 for device C is set and the OTHER IOP field 303 is assigned the identifying code for mIOP 204 (or the IOP with the lowest total if more than one sIOP 206 is in the system).

If the load count for device C is greater than one-half of the difference between the totals for mIOP 204 and sIOP 206, then device C is the only device to be switched at this time. However, if it is less, the search for device(s) to switch would repeat itself using the remaining devices assigned to sIOP 206 and the remainder of the imbalance until the total number of load counts going to be switched is greater than one-half the original difference. A potential limitation to continuing the search for more devices to be switched is a maximum switch parameter. This parameter restricts the number of devices that can be switched during a given call of the load balancing algorithm.

In the example, device C would be the only device chosen for the switch and, assuming the pattern of I/O jobs continues, the switch would result in new totals for mIOP 204 and sIOP 206 of 25 and 30, respectively. This is a reduction of 67% in the original imbalance.

As previously mentioned, each IOP has a message queue for storing its incoming I/O job requests. These incoming requests are directed to a particular IOP based on the I/O device designated in the IOCB. It is essential to ensure proper routing, and the subsequent performance, of incoming I/O job requests. So to obviate the risk of erroneously routing I/O job requests because an IOP/ I/O device assignment is in the process of change, a temporary message queue or switch-in-progress message queue (SIPMQ) is used. Another purpose for the SIPMQ stems from the situation where a unit switch routine has to be aborted (i.e. for time limitations). In this instance, the I/O job requests received during the routine are linked back to the previously assigned IOP, 204 or 206, and not to the IOP to be assigned.

Continuing with the example, after determining the device(s) to be switched, the steps of the actual switch of the load balancing algorithm begins. First, mIOP 204 sends a message to the SIPMQ, step 518. This message, referred to as a kick queue message, not only primes the SIPMQ to receive messages during the unit switch portion of the algorithm but also serves to restart the device which has been idled during the switch as described below. Because the exemplary embodiment of the present invention employs only one SIPMQ for storing received I/O job requests while a unit switch takes place, only one device can be switched at a time. As is known to those skilled in the art, modifying the unit switch portion of the load balancing algorithm and employing additional SIPMQ's could loosen the one-device-at-a-time limitation.

Next, mIOP 204 resets the SWPND field 304 and sets the SWINP field 306 for the device to be switched, step 520. Then mIOP 204 sends a message to the message queue of sIOP 206 instructing the sIOP 206 to idle the device to be switched, also step 520. Eventually, the sIOP 206 will encounter the idle unit message. Upon finding the message, sIOP 206 checks the state of the unit: if the unit is idle it notifies mIOP 204 as such, otherwise it waits until the unit is idle to notify the mIOP 204. The notification that a unit is idle is achieved by updating the status field of its corresponding device table entry.

Upon notification that the device is idle, mIOP 204 changes the SERVICE IOP field 302 in the load table 301 for the device to the identifying code that had been placed in the OTHER IOP field 303, step 522. This corresponds to the IOP with the lowest total (e.g. mIOP 204), step 522. During the time the device is being switched, any I/O job requests received by mIOP 204 that are directed to that device are stored in the SIPMQ as already mentioned. The mIOP 204 knows to store such requests in the SIPMQ because, when checking to see which IOP 204 or 206 is assigned to the particular device, it also checks the SWINP field 306. If the field is set, mIOP 204 sends the request to the SIPMQ.

After mIOP 204 changes the designated IOP in the SERVICE IOP field 302 of the load table 301, any stored I/O job requests in SIPMQ are handled by the IOP which is currently servicing the switched device, step 524. The new service IOP now handles of any messages in the SIPMQ, then resumes normal operation by turning its attention back to its own message queue. Finally, mIOP 204 resets the SWINP field 306 signalling an end to this branch of the load balancing algorithm until the next time it is performed, step 526. As with the other branch of the load balancing algorithm, mIOP 204 also resets the LOAD COUNT field 308 for all units checked during the load balancing algorithm, also step 526. Note that the resetting of the load counts only happens once during each invocation of the load balancing algorithm, this is done in preparation of keeping track of the I/O activity for the next interval.

Note that if more than one unit were initially designated to be switched, the above described unit switch procedure would be repeated for all of them unless interrupted or aborted due to time limitations or other higher priority operations.

VII. Death of a sIOP

With reference to FIG. 2, the parallel configuration of the mIOP 204 with sIOP 206 is well-suited for serving and enhancing many aspects of processing system 100. Another such enhancement is improved I/O system resiliency.

The parallel configuration conveniently provides the first step to quickly and easily handle the loss of an sIOP 206. Because the IOP's 204 and 206 are in parallel, the necessary hardware connections are already in place. And because mIOP 204 is programmed with all the capabilities of an sIOP 204, there are no deficiencies in functional requirements. Thus, once mIOP 204 detects the loss of sIOP 206, it can change sIOP's 206 active status, thus removing it from the processing system 100, and access any pending or incomplete I/O job requests from sIOP's 206 message queue of which mIOP 204 has a copy in its local memory.

Figure 6:
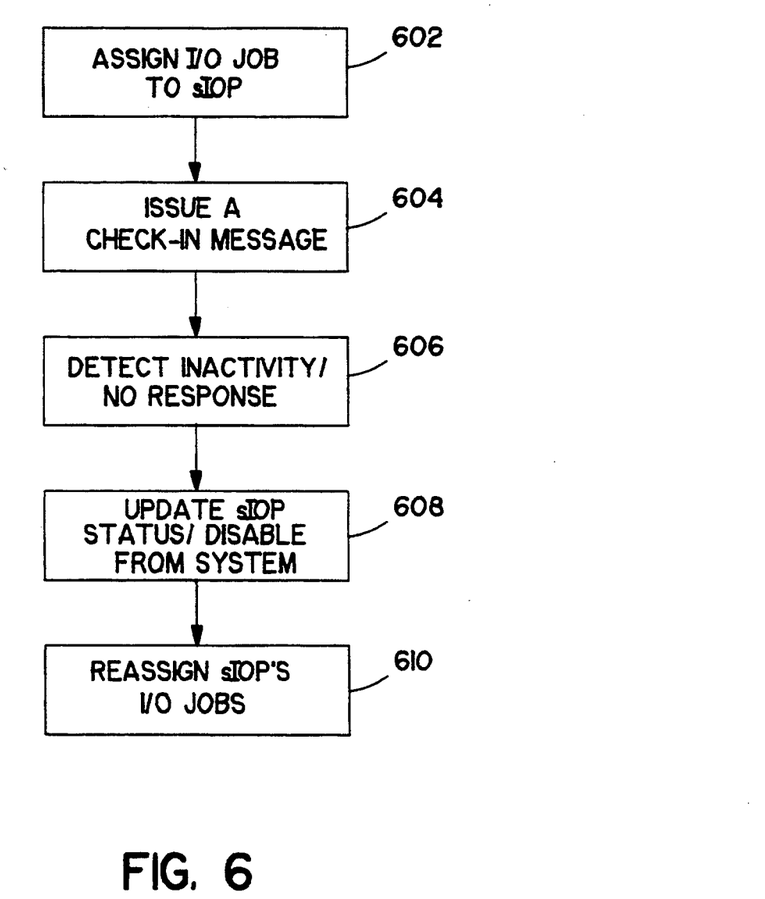
FIG. 6 is a flow chart representing the process of a master IOP replacing a failed slave IOP in the configuration of FIG. 2.

For example, and with reference to FIG. 6, mIOP 204 is responsible for managing devices involved with the performance of I/O job requests. One such device in processing system 100 is sIOP 206. In the process of managing devices involved with I/O job requests, typically, mIOP 204 allocates an I/O job request, step 602, then monitors the time it takes to complete a job, step 604. In the exemplary embodiment of this invention, this monitoring takes place by way of a check-in message issued by mIOP 204. After a predetermined time-out interval (one second in the exemplary embodiment), if sIOP 206 does not respond, mIOP 204 assumes that sIOP 206 is no longer functioning, step 606. This is followed by mIOP 204 disabling the sIOP 206 from the system and updating its status field in the device table accordingly, step 608.

After updating the status of sIOP 206, mIOP 204 accesses and reassigns any I/O job requests that sIOP 206 was either performing or had accumulated in its message queue, step 610. In the exemplary embodiment, the I/O job requests that are to be reassigned would be taken on by mIOP 204; however, as is apparent to those skilled in the art, if other sIOP's 206 remained active in system, mIOP 204 could reassign the I/O job requests to any, or all, of the remaining IOP's 204 and/or 206.

VIII. sIOP reconfigured to be an mIOP

Consistent with the concept of filling in for a non-functioning IOP with a parallel counter-part, sIOP 206 can replace mIOP 204 if mIOP 204 fails, although the replacement process is more complicated. Once again, because IOP's 204 and 206 are in parallel, the necessary hardware connections are already in place. However, because, during the operation of the I/O system, sIOP 206 does not keep track of everything mIOP 204 does. This deficiency makes for a more complicated replacement strategy.

Figure 7:
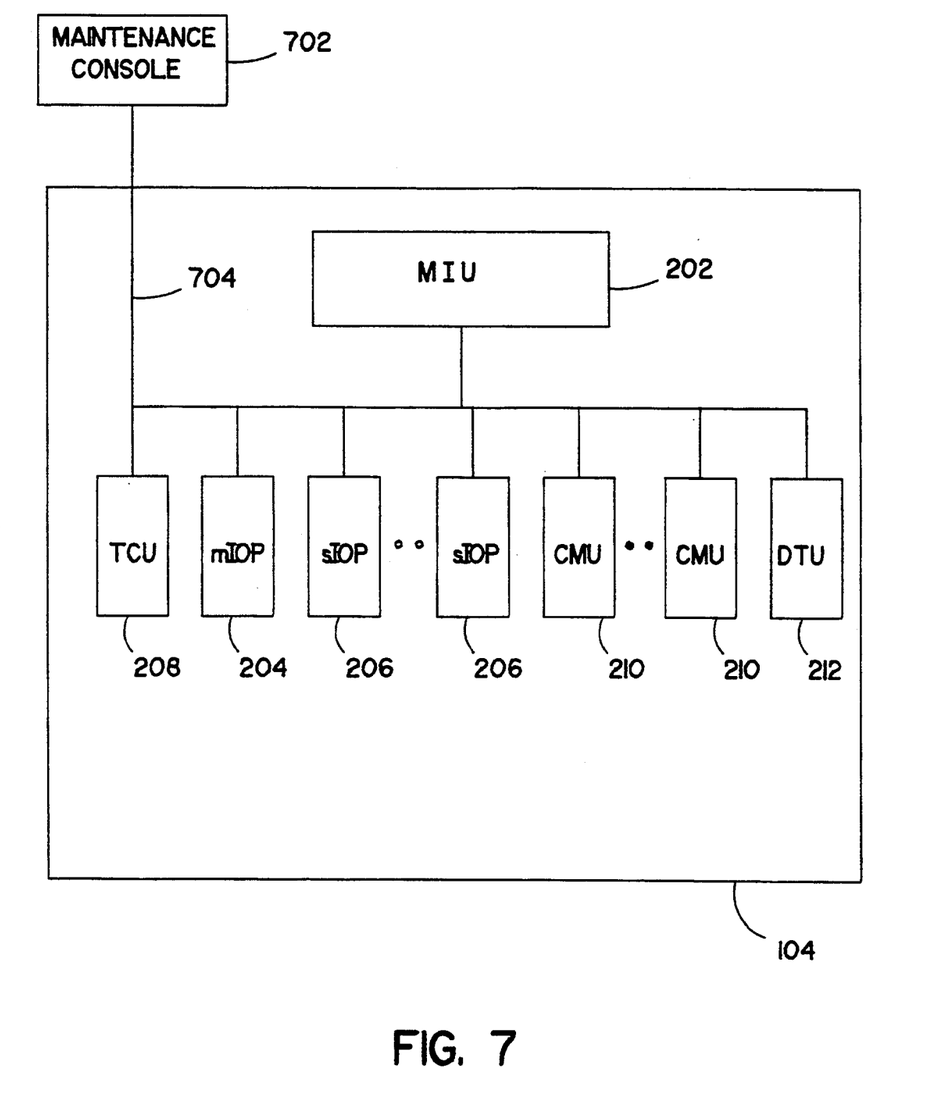
FIG. 7 is a block diagram which illustrates the configuration of the console in the processing system of FIG. 1.

In the exemplary embodiment, with the assistance of a maintenance console 702 directly linked to each processor, as seen in FIG. 7, sIOP 206 is loaded with the information from mIOP 204 that is needed to allow the IOP 206 to perform the functions of a master IOP.

The maintenance console 702 is linked to each of the processors via a serial scan path 704. The path through any particular processor includes all important storage devices. The path through the IOP's particularly includes the portion of local memory containing the device and load tables. Thus, the serial scan path 704 gives the console 702 access to the sIOP's 206 memory for the purpose of loading the necessary information such as bus and controller status, stored incoming messages, and data from the tables. Normally, this scan path is used to obtain a state dump of the system in the event of a failure in the I/O processor circuitry.

In order for data to be transferred from the defunct IOP 204 to the IOP 206, the I/O system is halted. This is not a problem, however, since, in the exemplary embodiment, the entire system would be inoperative without an mIOP.

In the exemplary embodiment of the invention, the CPU's 102 and I/O module 104 are halted as soon as the failed mIOP 204 is detected. The maintenance console 702 then reads the entire state of the mIOP 204 using its serial scan path 704. From this state data, the console 702 reconstructs the message queue of the mIOP 204, the copies of the message queues for any of the slave sIOP's and the device and load tables as shown in FIG. 3. The console 702 then loads this data into the sIOP 206, also using the serial scan path, thus effectively reprogramming the IOP 206 to replace the failed mIOP 204.

When the system is restarted, it will appear to the new mIOP 206 that the new sIOP 204 has failed. The mIOP 206 will then take over the operations of the sIOP 204 as described above.

Appendix A

PROCEDURE LOAD_BALANCE;

```
(* This procedure will attempt to balance the unit load among the
   set of IOUs.  The first part of the procedure will calculate the
   current load for each IOU and determine which IOU has the heaviest
   and lightest loads.  The second part of the procedure will reallocate
   units from the 'heaviest' IOU to the 'lightest' IOU if the IOU load
   imbalance exceeds a preset imbalance threshold.

If a switch is still in progress when we attempt to load balance call
   HANDLE_SIPMQ to abort the current switch and return.  That will stop
   the current switch and the algorithm will go on to the next device,
   if there is one.

Always clear the load counters because when we do load balance the
   decision should be based on recent history.                      *)

CONST
  MAX_LOAD        = H'FFFFFFF';

VAR
  I               : BINARY[11..00];
  J               : INTEGER;
  LIGHTEST        : BINARY[27..00];
  HEAVIEST        : BINARY[27..00];
  SERVER          : BINARY[02..00];
  LOAD            : BINARY[15..00];
  LIGHT_IOP       : BINARY[02..00];
  HEAVY_IOP       : BINARY[02..00];
  IMBALANCE       : BINARY[27..00];
  LOAD_LEFT       : BINARY[27..00];
  SPREAD          : BINARY[15..00];
  CURRENT_SPREAD  : BINARY[15..00];
  CURRENT_DEV     : BINARY[11..00];
  TOTAL_LOAD      : LOAD_TYPE[00..05];

BEGIN
  IF MB_READP[SIPMQ]=MB_WRITEP[SIPMQ] THEN
  BEGIN
    FOR I:=0 TO 5 DO
    BEGIN
      TOTAL_LOAD[I]:=0;
    END;

FOR I:=MIN_UNIT_ID TO MAX_UNIT_ID DO
    BEGIN
      SERVER:=LOAD_TABLE[I].SERVICE_IOP;
      LOAD  :=LOAD_TABLE[I].LOAD_COUNT;
      TOTAL_LOAD[SERVER]:=TOTAL_LOAD[SERVER]+LOAD;
    END;

(* Check and see if the total load for the 'heaviest' and 'lightest'
     IOU's is greater than the imbalance threshold.  If it is we must
     reallocate some units.                                         *)

LIGHTEST:=MAX_LOAD;
    HEAVIEST:=0;
    LIGHT_IOP:=0;
    HEAVY_IOP:=0;
    FOR I:=0 TO 5 DO
    BEGIN
      IF IOP_TABLE[I].IOP_RUNNING THEN
      BEGIN
        IF TOTAL_LOAD[I] < LIGHTEST THEN
        BEGIN
          LIGHTEST:=TOTAL_LOAD[I];
          LIGHT_IOP:=I;
        END;    (* of LIGHTEST *)
        IF TOTAL_LOAD[I] > HEAVIEST THEN
        BEGIN
```

```
        HEAVIEST:=TOTAL_LOAD[I];
        HEAVY_IOP:=I;
      END;     (* of HEAVIEST *)
    END;       (* of IOP_RUNNING *)
  END;

IMBALANCE:=HEAVIEST - LIGHTEST;

(* Reallocate enough units, within the limits of MAX_SWITCHES,
   in order to transfer at least half of the
   load difference between the heaviest and the lightest.         *)

IF IMBALANCE > MAX_IMBALNCE THEN
  BEGIN
    J:=0;
    LOAD_LEFT:=IMBALANCE/2;
    WHILE (J < MAX_SWITCHES) AND (LOAD_LEFT > 0) DO
    BEGIN
      CURRENT_SPREAD:=MAX_LOAD;
      CURRENT_DEV:=0;
      FOR I:=MIN_UNIT_ID TO MAX_UNIT_ID DO
      BEGIN
        IF (LOAD_TABLE[I].SERVICE_IOP = HEAVY_IOP)  AND
           (NOT LOAD_TABLE[I].SWITCH_PENDING)         THEN
        BEGIN
          IF LOAD_TABLE[I].LOAD_COUNT > LOAD_LEFT
            THEN SPREAD:=LOAD_TABLE[I].LOAD_COUNT - LOAD_LEFT
            ELSE SPREAD:=LOAD_LEFT - LOAD_TABLE[I].LOAD_COUNT;
          IF SPREAD < CURRENT_SPREAD THEN
          BEGIN
            CURRENT_SPREAD:=SPREAD;
            CURRENT_DEV:=I;
          END;
        END;    (* of IOP=HEAVY_IOP AND NOT SWITCH_PENDING *)
      END;      (* of FOR I...    *)
      IF CURRENT_DEV <> 0 THEN
      BEGIN
        LOAD_TABLE[CURRENT_DEV].SWITCH_PENDING:=1;
        IF LOAD_LEFT > LOAD_TABLE[CURRENT_DEV].LOAD_COUNT THEN
          LOAD_LEFT:=LOAD_LEFT-LOAD_TABLE[CURRENT_DEV].LOAD_COUNT
        ELSE LOAD_LEFT:=0;
        LOAD_TABLE[CURRENT_DEV].OTHER_IOP:=LIGHT_IOP;
        J:=J+1;
      END
      ELSE FAULT(LOAD_BALANCE_LOST);
    END;        (* of WHILE...   *)
(* All units that will be switched now have SWITCH_PENDING set.  Pick
   the first one and initiate the switch.                          *)

INITIATE_UNIT_SWITCH;
  END;
END
ELSE HANDLE_SIPMQ;

(* Clear load counters for all units so we can start accumulating
   a history for the next interval.                                *)

FOR I:=MIN_UNIT_ID TO MAX_UNIT_ID DO
  BEGIN
    LOAD_TABLE[I].LOAD_COUNT:=0;
  END;

END;  (* of PROCEDURE LOAD_BALANCE

Appendix B

PROCEDURE INITIATE_UNIT_SWITCH;
```

(* This procedure searches the load table for the next unit that has
    SWITCH_PENDING, transitions the unit to SWITCH_IN_PROGRESS, and
    sends a idle unit message to the servicing IOP. The Switch In
    Progress Message Queue (SIPMQ) is also allocated for this device
    and a 'kickq' message is inserted at the head.  Once the device
    does go idle the SIPMQ is flushed and the first message received
    by the new IOP for this device will be the 'kick_q'.          *)

```
VAR
   I         : BINARY[11..00];
   FOUND     : BINARY[00..00];
   SERVER    : BINARY[02..00];
   MESSAGE   : MESSAGE_TYPE;

BEGIN
   INITIATE_UNIT_SWITCH_FLAG := 0;
   I:=MIN_UNIT_ID;
   FOUND:=0;
   WHILE (NOT(I > MAX_UNIT_ID)) AND NOT FOUND DO
   BEGIN
      IF LOAD_TABLE[I].SWITCH_PENDING THEN
      BEGIN
         FOUND:=1;
         SEND_IOP_REQUEST_MESSAGE_VIA_SMQ(SIPMQ,
                                  I,              (* unit device index *)
                                  0,
                                  0,
                                  kick_q);
         LOAD_TABLE[I].SWITCH_PENDING:=0;
         LOAD_TABLE[I].SWITCH_IN_PROGRESS:=1;
         SERVER:=LOAD_TABLE[I].SERVICE_IOP;
         SEND_IOP_REQUEST_MESSAGE_VIA_SMQ(SERVER,
                                  I,              (* device index *)
                                  0,
                                  0,
                                  idle_unit);

(* allocate SIPMQ *)
         SWITCHING_ID:=I;
   (* MB_READP[SIPMQ]:=MB_BASE[SIPMQ];  don't reset - let queue wrap *)
   (* MB_WRITEP[SIPMQ]:=MB_BASE[SIPMQ]; this will give some history  *)
      END;
      I:=I+1;
   END;
END;   (* of PROCEDURE INITIATE_UNIT_SWITCH
```

What is claimed:

1. In a processing system including at least one CPU which issues I/O job function requests, a main memory and a plurality of I/O devices, a system for handling the I/O job function requests comprising:

at least two I/O processor means, separate from the CPU, for performing I/O job functions including selecting paths and managing I/O devices;

I/O controller means, coupled to the CPU, for allocating received I/O job function requests between the two I/O processor means; and data structure means for storing I/O device information used during allocation to the I/O job function requests, wherein the I/O controller means receives an I/O job function request from the one CPU, and responsive to the device information in the data structure means assigns the I/O job function to one of the I/O processor means.

2. In a processing system including at least one CPU which issues I/O job function requests, a main memory and a plurality of I/O devices, a system for handling the I/O job function requests comprising:

at least two I/O processor means for performing I/O job functions including selecting paths and managing I/O devices;

I/O controller means, coupled to the CPU, for allocating received I/O job function requests between the two I/O processor means, wherein one of the I/O processor means includes the I/O controller means; and data structure means for storing I/O device information used during allocation of the I/O job function requests, wherein the I/O controller means receives an I/O job function request from the one CPU, and responsive to the device information in the data structure means assigns the I/O job function to one of the I/O processor means.

3. In a processing system including at least one CPU which issues I/O job function requests, a main memory and a plurality of I/O devices, a system for handling the I/O job function requests comprising:

at least one slave I/O processor (sIOP) means, separate from the CPU, for performing I/O job functions including selecting paths and managing I/O devices;

master I/O processor (mIOP) means, separate from the CPU, for both performing I/O job functions including selecting paths and managing I/O devices, and allocating received I/O job function requests between the sIOP means and the mIOP means; and data structure means for storing information used during allocation of I/O job function request, wherein the mIOP, being coupled to the CPU, receives an I/O job function request from the at least one CPU, and based on the information in the data structure means either assigns the I/O job function to the sIOP means or the mIOP means.

4. The system of claim 3, further comprising a Task Control Unit (TCU) which receives the I/O job function request from the one CPU and which transfers the received I/O job function request to the mIOP.

5. The system of claim 3, further comprising a data transfer unit (DTU) which performs disk caching to expedite the access of either the mIOP means or the sIOP means to data which would otherwise be located in a disk device.

6. The system of claim 3, further comprising a memory interface unit (MIU) which arbitrates between a plurality of requests issued by the mIOP means and the sIOP means for access to data in the main memory.

7. The system of claim 6, wherein the mIOP means and the at least one sIOP means are coupled in parallel to the MIU which is coupled to main memory.

8. The system of claim 3, which further comprises a console means having access to both the mIOP means and the sIOP means for loading information retrieved from the mIOP means into the sIOP means.

9. The system of claim 8, wherein the console means accesses a local memory of both the mIOP means and the sIOP means via a serial scan path.

10. In a processing system including at least one CPU which issues I/O job requests, a main memory, at least two I/O processors, and a plurality of I/O devices each assigned to be serviced by one of the I/O processors, a process for substantially evenly distributing the I/O jobs among the I/O processors, comprising the steps of:
a) generating a value representing the number of I/O jobs handled by each I/O device during a predetermined time interval;
b) calculating a total number of I/O jobs for each I/O processor as a sum of the value generated in step a) for each I/O device which is assigned to the I/O processor, wherein at least a highest total and a lowest total are obtained;
c) calculating a difference value as the difference between the I/O processors with the highest and lowest totals from step b) for the I/O processors;
d) comparing the difference value in step c) with a predetermined maximum allowable difference value;
e) if the difference value in step c) is greater than a predetermined maximum allowable difference value,
  (i) reassigning from the I/O processor having the highest total in step b) to the I/O processor having the lowest total in step b) the I/O device with the value from step a) which is closest in value to the difference value from step c) divided by two, and
  (ii) repeating step e) using the remainder of the difference value from step c) as the difference value if the total number of I/O jobs reassigned is less than one-half the difference value from step c);
f) resetting the I/O job counts for the I/O devices.

11. The process of claim 10, where step e)(i) further comprises:
a) designating the I/O device to be switched as waiting to be switched;
b) activating a temporary memory space to receive I/O job requests directed at the I/O device to be switched during the step e)(i);
c) re-designating the I/O device to be switched as currently being switched;
d) instructing the I/O processor having the highest total from step b) to idle the I/O device to be switched;
e) reassigning the I/O device, after the I/O device is idle, from the I/O processor with the highest total from step b) to the I/O processor with the lowest total from step b); and
f) instructing the I/O processor with the lowest total from step b) to handle any I/O job requests in the temporary memory space.

12. The process of claim 10, wherein the predetermined time interval of step a) is one second.

13. The process of claim 10, wherein step e)(ii) is limited by a predetermined maximum number of devices to be switched.

14. In a processing system including at least two I/O processors which both handle I/O job requests, and wherein one of the I/O processors also allocates I/O job requests between the at least two I/O processors, a process for detecting a failed non-allocating (slave) I/O processor and replacing that non-allocating (slave) I/O processor with the allocating (master) I/O processor to enhance system resiliency, comprising the steps of:
a) issuing a check-in message from the allocating I/O processor to one of the non-allocating processors;
b) detecting that the non-allocating I/O processor has not responded within a predetermined time period;
c) disabling the non-responding, non-allocating I/O processor from the processing system;
d) accessing any I/O job requests that the non-responding, non-allocating I/O processor had not handled; and
e) re-allocating the any I/O jobs the non-responding, non-allocating I/O processor had not handled to another I/O processor in the processing system.

15. The process of claim 14, wherein the allocating and non-allocating I/O processors are configured in parallel.

16. In a processing system including at least two I/O processors which both handle I/O job requests, and wherein one of the I/O processors also allocate I/O job requests between the two I/O processors, also including a console connected to each of the I/O processors with access to local memories of the I/O processors, a process for replacing the allocating (master) I/O processor with a non-allocating I/O processor to enhance system resiliency, comprising the steps of:
a) detecting that the allocating I/O processor is no longer functioning properly;
b) disabling the allocating I/O processor from the processing system;
c) retrieving, by way of the console, any I/O job requests which the allocating I/O processor had not handled and any information in the local memory of the allocating I/O processor needed for allocating the I/O job requests;

d) loading, by way of the console, the data retrieved in step c) into the non-allocating I/O processor; and e) restarting the processing system such that the non-allocating I/O processor is now an allocating processor.

17. The process of claim 16, wherein the allocating processor and non-allocating I/O processors are configured in parallel.

18. The process of claim 16, wherein the console is connected to the I/O processors via a serial scan path.

* * * * *

UNITED STATES PATENT AND TRADEMARK OFFICE
CERTIFICATE OF CORRECTION

PATENT NO.   : 5,313,584
DATED        : May 17, 1994
INVENTOR(S)  : Tickner et al.

It is certified that error appears in the above-identified patent and that said Letters Patent is hereby corrected as shown below:

Column 17, line 59, the word "to" should be --of--.

Column 20, line 53, the word "allocate" should be --allocates--.

Column 20, line 58, after the word "non-allocating" insert --(slave)--.

Signed and Sealed this

Twenty-fifth Day of October, 1994

Attest:

BRUCE LEHMAN

Attesting Officer

Commissioner of Patents and Trademarks